US009720910B2

(12) United States Patent
Byron et al.

(10) Patent No.: US 9,720,910 B2
(45) Date of Patent: Aug. 1, 2017

(54) USING BUSINESS PROCESS MODEL TO CREATE MACHINE TRANSLATION DICTIONARIES

(71) Applicant: International Business Machines Corporation, Armonk, NY (US)

(72) Inventors: Donna K. Byron, Petersham, MA (US); Lakshminarayanan Krishnamurthy, Round Rock, TX (US); Ravi S. Sinha, Austin, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/938,493

(22) Filed: Nov. 11, 2015

(65) Prior Publication Data
US 2017/0132213 A1 May 11, 2017

(51) Int. Cl.
*G06F 17/28* (2006.01)
*G06F 17/27* (2006.01)

(52) U.S. Cl.
CPC ........ *G06F 17/289* (2013.01); *G06F 17/2735* (2013.01)

(58) Field of Classification Search
CPC ...... G06F 17/28; G06F 17/27; G06F 17/2725; G06F 17/2735; G06F 17/275; G06F 17/2755; G06F 17/277; G06F 17/2881; G06F 17/289; G06F 17/30
USPC .......................... 704/7, 2, 4, 5, 8, 9, 10, 277
See application file for complete search history.

(56) References Cited

U.S. PATENT DOCUMENTS

| | | | |
|---|---|---|---|
| 5,991,710 A * | 11/1999 | Papineni | G06F 17/2818 704/2 |
| 8,296,127 B2 | 10/2012 | Marcu et al. | |
| 8,732,094 B2 | 5/2014 | Rosa et al. | |
| 8,762,933 B2 | 6/2014 | Balko et al. | |
| 8,825,713 B2 | 9/2014 | Guizar | |
| 2003/0126181 A1* | 7/2003 | Young | G06Q 10/10 718/100 |
| 2005/0256831 A1 | 11/2005 | Yang et al. | |
| 2006/0106824 A1* | 5/2006 | Stuhec | G06Q 30/08 |
| 2009/0083110 A1* | 3/2009 | Markovic | G06Q 10/06316 705/7.26 |
| 2011/0239183 A1 | 9/2011 | Paradkar et al. | |

(Continued)

OTHER PUBLICATIONS

Batoulis et al., "Automatic Business Process Model Translation With BPMT," CAiSE 2013 Workshops, LNBIP 148, Valencia, Spain, Jun. 2013, Springer-Verlag Berlin Heidelberg, pp. 217-228.

(Continued)

*Primary Examiner* — Qi Han
(74) *Attorney, Agent, or Firm* — VanLeeuwen & VanLeeuwen; Richard A. Wilhelm

(57) ABSTRACT

An approach is provided to receive a term that is included in a Business Process Model (BPM) data store with the term being from one natural language. The approach identifies that first descriptive text of the term is not available in the same natural language. A translated version of the term is retrieved from a different natural language stored in the BPM data store with descriptive text of the term being present in the different language. The descriptive text is translated to the given natural language, resulting in translated descriptive text that is, in turn, provided as a meaning of the term in the given language.

17 Claims, 5 Drawing Sheets

(56) References Cited

U.S. PATENT DOCUMENTS

| | | |
|---|---|---|
| 2011/0246530 A1 | 10/2011 | Malafsky |
| 2012/0060150 A1 | 3/2012 | Pechanec et al. |
| 2012/0109708 A1 | 5/2012 | Mueller et al. |
| 2013/0132141 A1 | 5/2013 | Delany et al. |
| 2013/0179365 A1 | 7/2013 | Passova et al. |
| 2014/0250121 A1 | 9/2014 | Kieselbach et al. |
| 2014/0288923 A1 | 9/2014 | Marian et al. |

OTHER PUBLICATIONS

Lerchner et al., "An Open S-BPM Runtime Environment Based on Abstract State Machines," 2014 IEEE 16th Conference on Business Informatics, Jul. 2014, Geneva, Switzerland, pp. 54-61.

Norton et al., "Ontology-Based Translation of Business Process Models," 2009 Fourth International Conference on Internet and Web Applications and Services, May 2009, Venice/Mestre, Italy, pp. 481-486.

Zhao et al., "Statistical Machine Learning in Natural Language Understanding: Object Constraint Language Translator for Business Process," IEEE International Symposium on Knowledge Acquisition and Modeling Workshop, 2008 (KAM Workshop 2008), Dec. 2008, Wuhan, China, pp. 1056-1059.

\* cited by examiner

USING BUSINESS PROCESS MODEL TO CREATE MACHINE TRANSLATION DICTIONARIES

BACKGROUND

A Business Process Model is a specialized kind of ontology that defines events and objects relevant for a particular enterprise or industry. A key characteristic of a BPM is that it organizes the world into small chunks that manifest as short labels (the node labels in the BPM) paired with longer descriptive text (the human-readable documentation or description of the node). In the field of statistical machine translation (SMT), obtaining linguistic examples of enterprise-specific language that can be used to create lexical and phrase-structure models for translating business or industry-specific language can be a challenge. Creating lexicons and grammars to perform translation is very time-consuming if performed manually, and requires very specialized skills.

BRIEF SUMMARY

An approach is provided to receive a term that is included in a Business Process Model (BPM) data store with the term being from one natural language. The approach identifies that first descriptive text of the term is not available in the same natural language. A translated version of the term is retrieved from a different natural language stored in the BPM data store with descriptive text of the term being present in the different language. The descriptive text is translated to the given natural language, resulting in translated descriptive text that is, in turn, provided as a meaning of the term in the given language.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
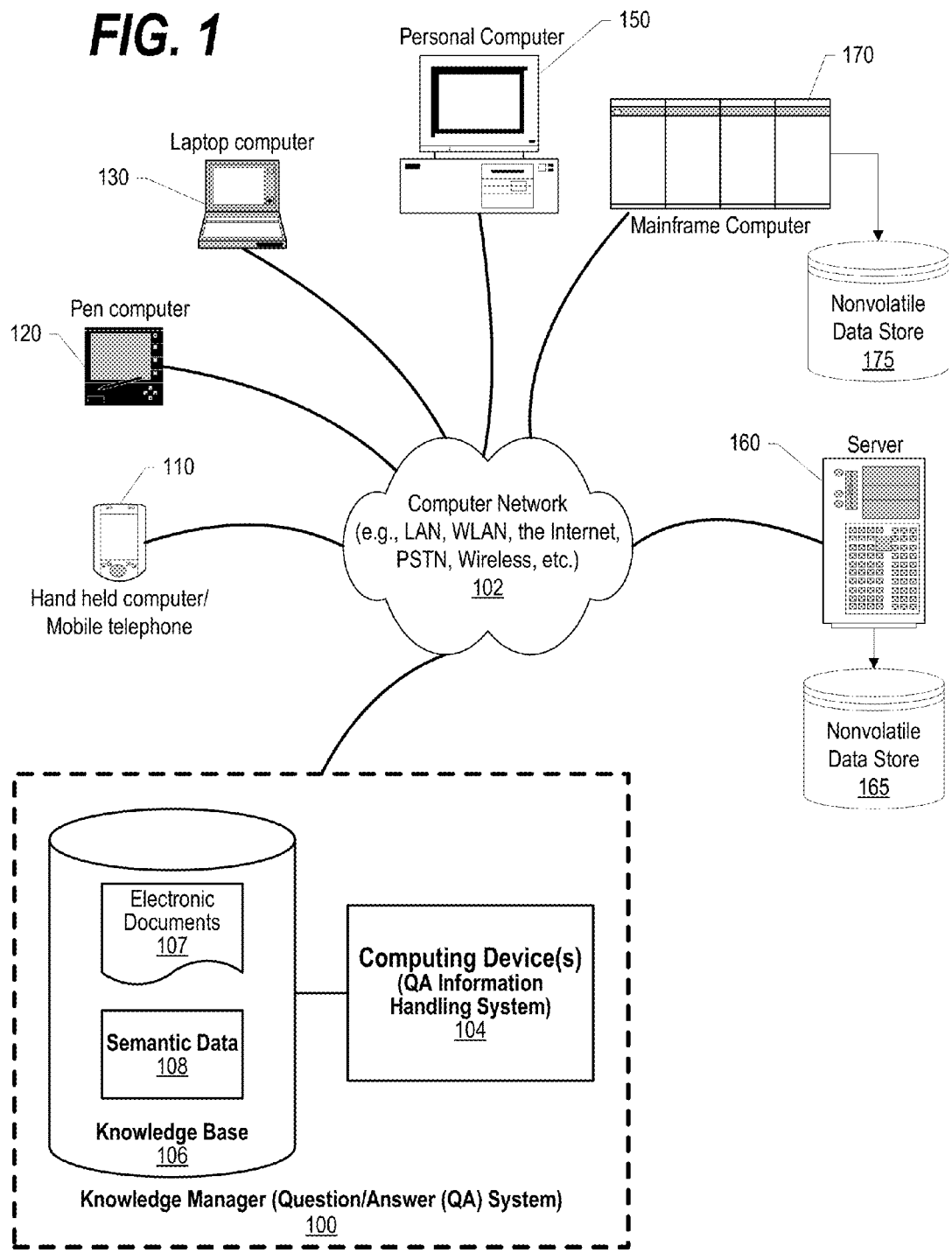
FIG. 1 depicts a schematic diagram of one illustrative embodiment of a question answering (QA) system in a computer network.

FIGS. 1-5 depict an approach that uses Business Process Model (BPM) data as a natural language resource that is ingested by a question answering (QA) system. A key characteristic of a BPM is that it organizes the world into small chunks that manifest as short labels (the node labels in the BPM) paired with longer descriptive text (the human-readable documentation or description of the node). Taken as a natural language resource, these labeled descriptions can be used for mining a variety of assets required to support natural language processing techniques. They contain domain-specific vocabulary items, document the correct predicate/argument structure, and distributional semantics of domain-specific language, among other things.

In global enterprises, BPMs sometimes exist with different versions written in multiple natural languages, such as English, Spanish, and Japanese. Thus, the BPM can provide aligned bilingual text that can be used to generate natural language translation resources for translating additional enterprise documents, such as product manuals, websites, employee training materials, etc.

Aligned bilingual text (referred to as parallel or comparable corpora, depending on how well aligned the two language variants are) is used throughout statistical machine translation for this purpose. Readily available parallel or comparable corpora are typically for open-domain language (news reports, web pages, parliament or government proceedings), or at least they are not specifically meant for a company or an enterprise. The approach provided herein is method of collecting the vocabulary, concept, and paraphrase examples from the bitext contained within the enterprise's collection of BPMs.

In other words, the approach provided is not directed to correct the BPM logic itself, but rather to collect language translation data out of the BPM pairs, for use in any natural language translation task. Translation of domain-specific or company-internal documents is hampered by the lack of bilingual dictionaries that inform the user as to how to translate terms such as 'claim' for the insurance industry. There are multiple definitions of 'claim' in English and access of an open-domain English-to-Spanish translation dictionary might not be provide by any matching terms for the term 'claim' in the insurance industry in Spanish. The approach addresses this issue by populating a data store with language examples that express the same concept, as indicated in the BPM, but in different languages. Statistical machine translation are then used with the pairs (same expression in two different languages) in a standard translation. The approach results in aligned bitext for both concept names and longer descriptive sentences in the process descriptions and comments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 (also referred to as a Knowledge Manager) in a computer network 102. QA system 100 may include computing device 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from QA System (knowledge manager) 100. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
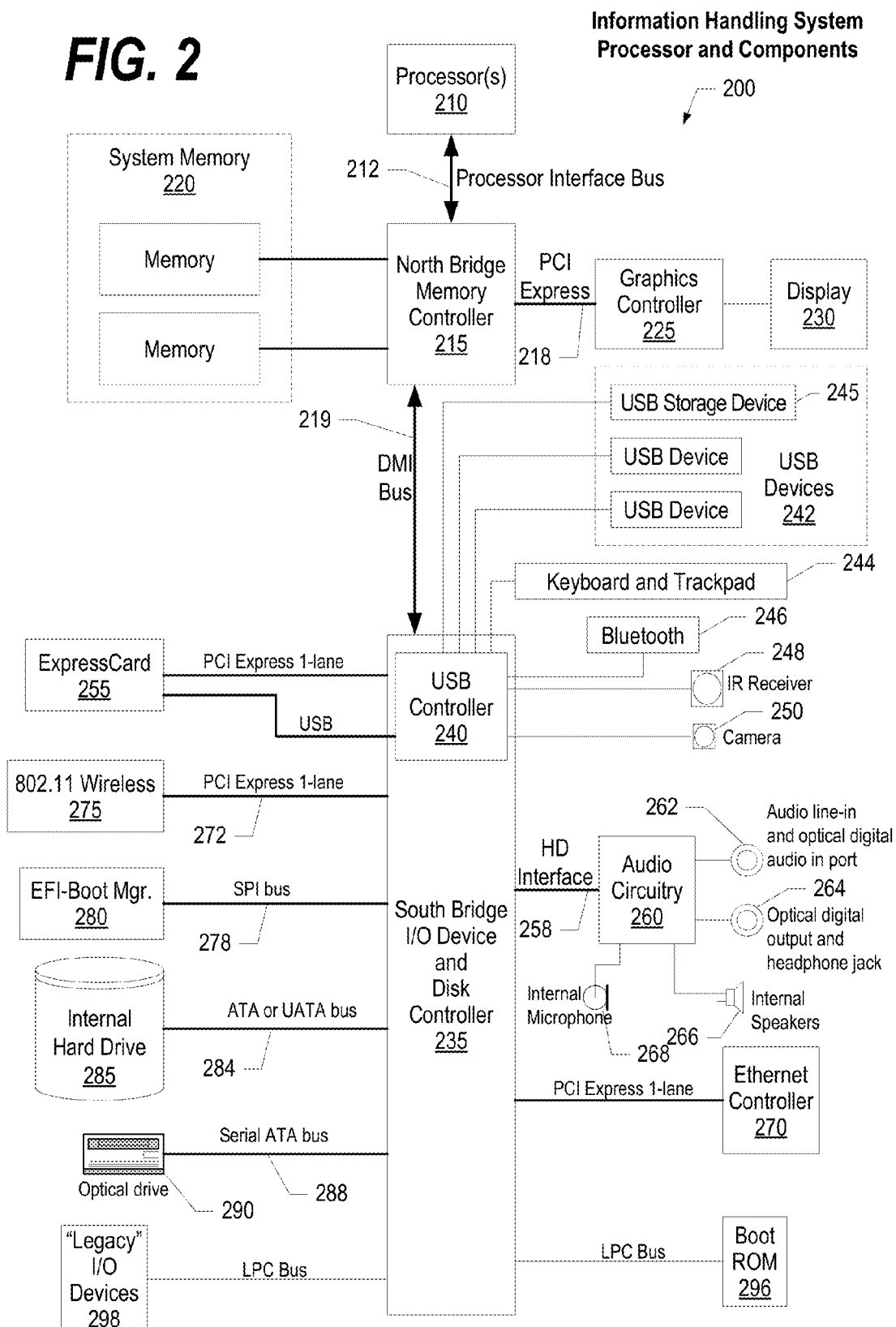
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
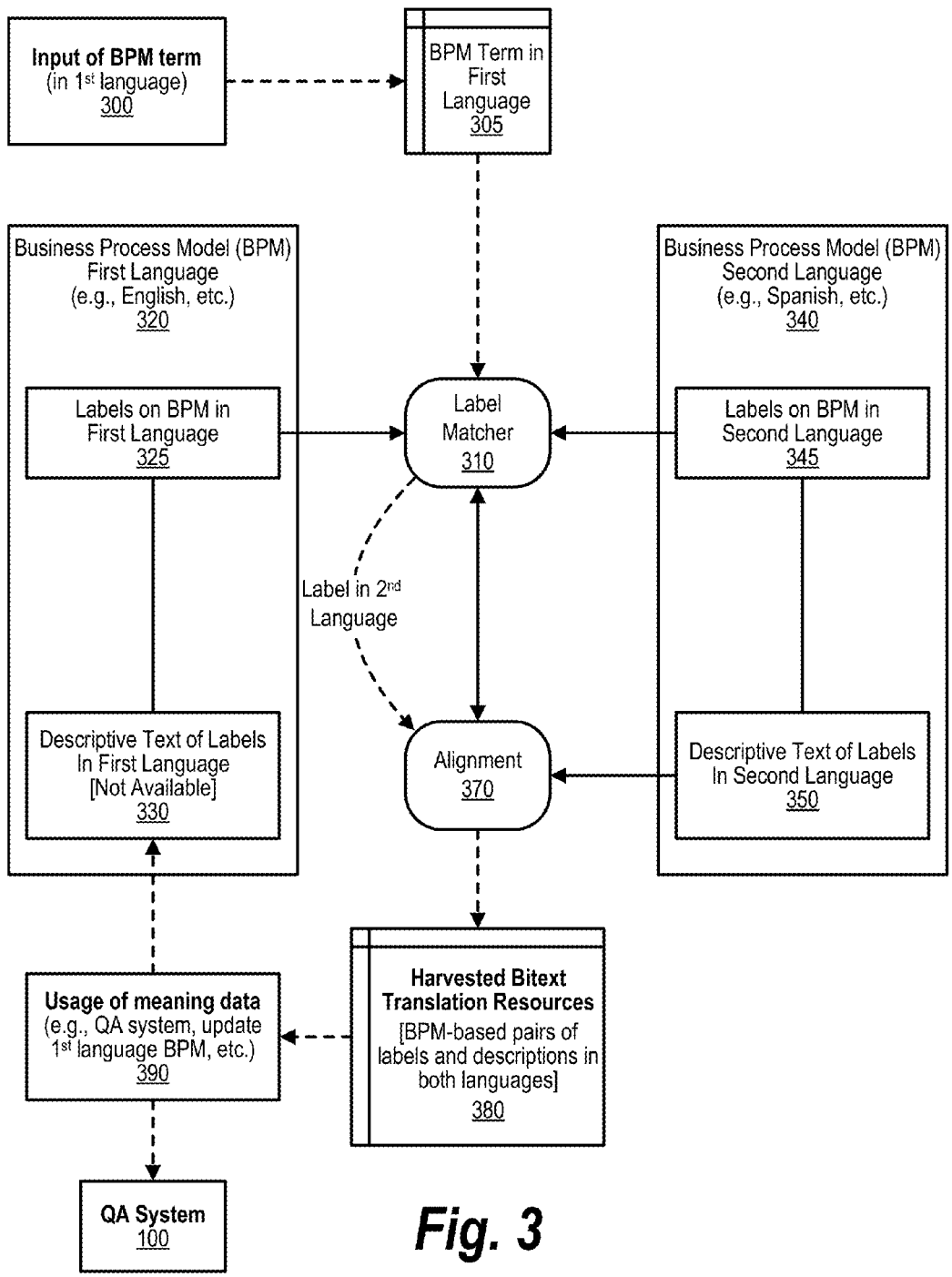
FIG. 3 is an exemplary diagram depicting the components utilized in using Business Process Models to create machine translation dictionaries.

FIG. 3 is an exemplary diagram depicting the components utilized in using Business Process Models to create machine translation dictionaries. The approach described herein is implemented by an information handling system that includes a memory and a processor and executes program instructions to receive a term that is included in a Business Process Model (BPM) data store 320. The term is input from requestor 300, such as a question answering (QA) system and is stored in memory 305. The provided term might be found in first BPM data store 320 by label matcher process 310 as a label 325 in the BPM process. In one embodiment, if the provided term is not found in the first language (label 325 not being found), then process 310 can generate the term by translating the term, or label, to the second language.

The term is from a first natural language, such as English. The approach identifies that first descriptive text 330 of the term in the first natural language is lacking. In response, the approach uses label matching process 310 to retrieve a translated version of the term 345 in a second natural language, such as Spanish, that is stored in BPM data store 340. The approach identifies that second descriptive text 350 of the translated version of the term is present in the second natural language. The approach uses alignment process 370 to align the BPM terms and descriptions found in pairs of BPM language translations. The alignment process finds corresponding nodes and descriptions in a second language BPM and uses this information to supplement BPM data lacking in a first language BPM. The alignment process skips any BPM node where corresponding labels or descriptions are not found in the second language. In this manner, many BPM languages, such as German, Italian, Japanese, etc. might be utilized as the second language (340) by alignment process 340 in order to find a language with a corresponding label and textual description that was lacking in the first BPM language (e.g., English, etc.).

The result of the approach is harvested bitext translation resources that are stored in memory area 380. The harvested bitext translation resources includes a set of BPM-based pairs of labels and descriptions in the first and second languages. These resources can be used to update BPM data store 320 with the translated descriptive text that is stored in 330. These resources can also be provided to QA system 100 when answering questions posed to the QA system. When used with a QA system, the BPM data store can be included in a corpus, such as corpus 106 shown in FIG. 1, that is utilized by the QA system. In this context, the system can update the BPM with the translated descriptive text.

In a QA system setting, a question expression is received from a requestor, such as a user that is posing the question to the QA system. The system retrieves the term from the question expression and identifies that the term is a business related term. The resulting translated descriptive text is then used as a context of the question expression when processed by the QA system.

In a further approach, the BPM data store can include a number of natural languages that include the first and second natural languages (320 and 340). The process searches through the stored BPMs in the various languages to identify one of the natural languages (second language 340) with a stored term corresponding to the received term and a stored descriptive text that describes the stored term.

Figure 4:
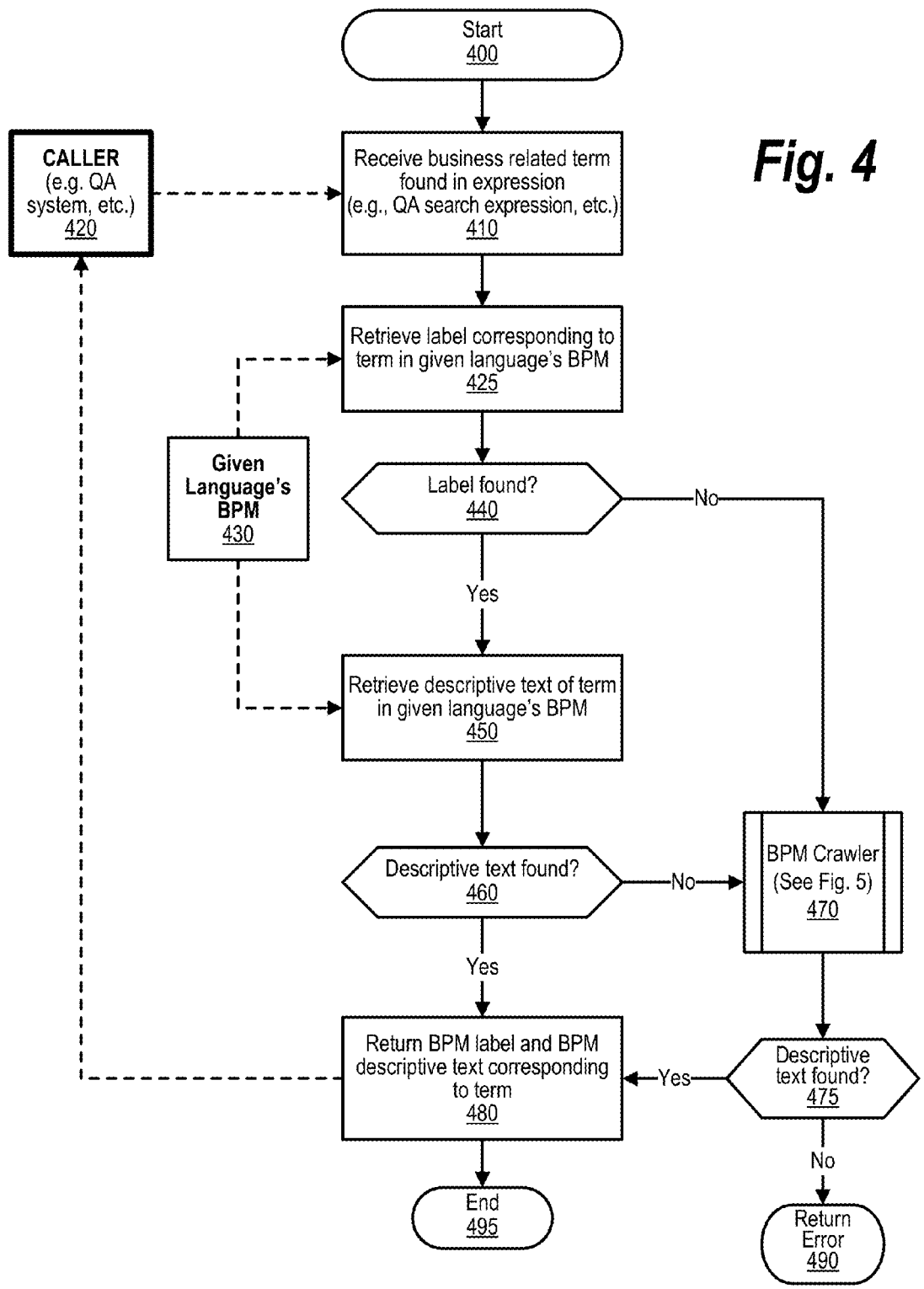
FIG. 4 is an exemplary flowchart that performs steps to use Business Process Models to create machine translation dictionaries.

FIG. 4 is an exemplary flowchart that performs steps to use Business Process Models to create machine translation dictionaries. FIG. 4 processing commences at 400. At step 410, the process receives a business related term that is found in expression, such as a search expression submitted to a question answering (QA) system, etc. The question expression or other expression with the business related term is received from requestor, or caller, 420. For example, the requestor can be the QA system.

At step 425, the process retrieves the label corresponding to the term in the given language's BPM. If the expression from requestor 420 is in English, then the given language's BPM is the English version of the BPM. The process determines as to whether the label matching the term was found in the BPM (decision 440). If the label matching the term was found in the BPM, then decision 440 branches to the 'yes' branch to perform step 450 and decision 460. At step 450, the process attempts to retrieve the descriptive text corresponding to the term in the given language's BPM. The process determines as to whether the descriptive text corresponding to the term was found in the given language's BPM (decision 460). If the descriptive text corresponding to the term was found in the given language's BPM, then decision 460 branches to the 'yes' branch whereupon the retrieved descriptive text is returned to the requestor, or caller, at step 480.

If either (1) the label matching the term was not found in the given language's BPM then decision 440 branches to the 'no' branch or, (2), the descriptive text corresponding to the term was not found in the given language's BPM, then decision 460 branches to the 'no' branch. In both these cases, the BPM Crawler routine is performed at predefined process 470 (see FIG. 5 and corresponding text for processing details).

After the BPM Crawler routine is performed, the process determines whether the BPM Crawler routine was able to find the descriptive text for the term in another language in the BPM (decision 475). If the BPM Crawler routine was able to find the descriptive text for the term in another language, then decision 475 branches to the 'yes' branch whereupon, at step 480, the process returns the BPM label and the BPM descriptive text corresponding to term back to requestor, or caller, 420, and processing thereafter ends at 495. On the other hand, if the BPM Crawler routine was unable to find the descriptive text for the term in another language, then decision 475 branches to the 'no' branch whereupon, processing ends at 490 with an error condition indicating that the descriptive text was not found in the BPM.

Figure 5:
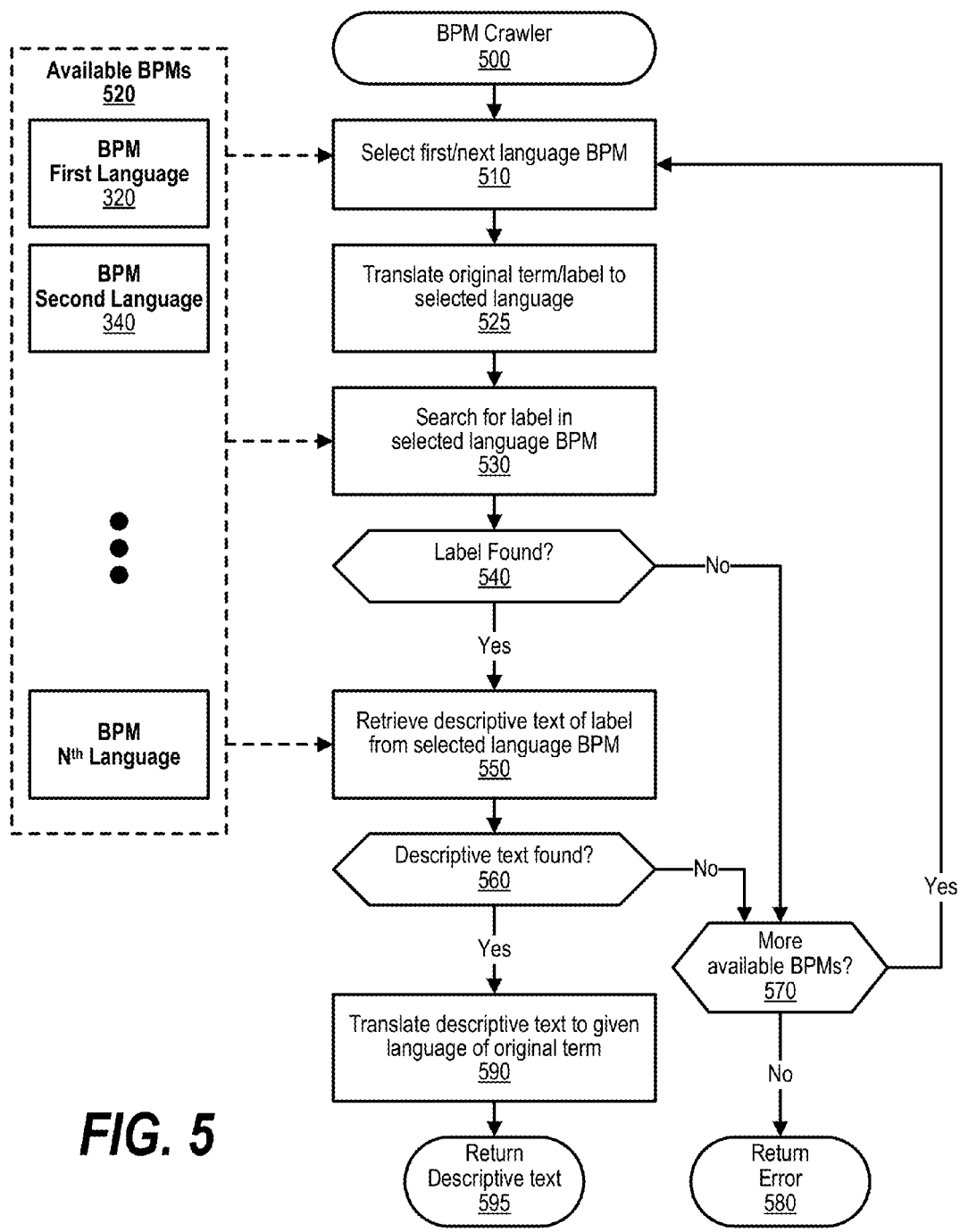
FIG. 5 is an exemplary flowchart that performs steps to perform traverse a Business Process Model data store to extract descriptive text of labels in other languages.

FIG. 5 is an exemplary flowchart that performs steps to perform traverse a Business Process Model data store to extract descriptive text of labels in other languages. FIG. 5 processing commences at 500 and shows the steps taken by the BPM Crawler routine that is called by the process shown in FIG. 4. At step 510, the process selects the first language BPM from available BPMs 520. The available BPMs include the BPM first language (e.g., English, etc.) 320 and the BPM second language (e.g., Spanish, etc.) 340. At step 525, the process translates the original term, or label, to the natural language that was selected in step 510. At step 530, the process searches for the translated version of the term in the selected natural language BPM.

The process determines as to whether the translated version of the term was found in the selected natural language BPM (decision 540). If the translated version of the term was found in the selected natural language BPM, then decision 540 branches to the 'yes' branch to perform step 550. On the other hand, if the translated version of the term was not found in the selected natural language BPM, then decision 540 branches to the 'no' branch bypassing step 550. At step 550, the process attempts to retrieve the descriptive text corresponding to the term from the selected language's BPM.

The process determines as to whether the descriptive text corresponding to the term was found in the selected language's BPM (decision 560). If the descriptive text corresponding to the term was not found in the selected language's BPM, then decision 560 branches to the 'no' branch and the process next determines whether there are more available natural language BPMs to process (decision 570). Processing continues to loop back to step 510 to select and attempt to find descriptive text in the next natural language BPM as described above until either the descriptive text is found (with decision 560 branching to the 'yes' branch), or until there are no more natural language BPM's in available BPMs 520. If there are no more natural language BPM's in available BPMs 520 to process, then decision 570 branches to the 'no' branch whereupon, at 580, an error is return indicating that the descriptive text was not found in any of the natural language BPMs and processing returns to the calling routine (see FIG. 4).

When descriptive text is found for the term in one of the available natural language BPMs, then at step 590, the process translates the descriptive text found in the other language's BPM to the given language of the original term provided by the requestor. This translated text is returned to the calling routine (see FIG. 4) at 595.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    receiving a term that is included in a Business Process Model (BPM) data store, wherein the term is from a first natural language, and wherein the term is included in a natural language question from a requestor to a question answering (QA) system, and wherein the BPM data store is included in a corpus utilized by the QA system;
    identifying that a first descriptive text of the term in the first natural language is lacking;
    retrieving a translated version of the term in a second natural language stored in the BPM data store, wherein a second descriptive text of the translated version of the term is present in the second natural language;
    translating the second descriptive text from the second natural language to the first natural language, resulting in a translated descriptive text;
    providing, to the QA system, the translated descriptive text as a meaning of the term in the first natural language; and
    answering, by the QA system, the natural language question from the requestor, wherein the answering comprises:
        searching the corpus for a plurality of candidate answers to the natural language question;
        scoring the plurality of candidate answers, wherein the scoring indicates an extent to which each of the plurality of candidate answers is inferred by the natural language question, wherein the scoring further comprises weighting the plurality of scored candidate answers using a machine generated statistical model, wherein the statistical model indicates a level of confidence of the QA system, the weighting resulting in weighted scores corresponding to each of the candidate answers; and
        providing one or more of the candidate answers based on the weighted scores.

2. The method of claim 1 further comprising:
    updating the BPM with the translated descriptive text, wherein the translated descriptive text is stored in the BPM as the first descriptive text and wherein the first descriptive text is associated with the term.

3. The method of claim 1 further comprising:
    receiving, at the QA system, a question expression from the requestor;
    identifying that the term is a business related term that is included in the received question expression;
    receiving, at the QA system, the provided translated descriptive text as a context of the question expression; and
    wherein the answering utilizes the context of the question expression.

4. The method of claim 1 wherein the BPM data store includes a plurality of natural languages that include the first and second natural languages, and wherein the method further comprises:
    searching through one or more of the plurality of natural languages to identify one of the natural languages with a stored term corresponding to the received term and a stored descriptive text that describes the stored term, wherein the identified natural language is used as the second natural language.

5. The method of claim 1 further comprising:
    identifying that the term is lacking from the BPM data store;
    translating the term to the second natural language forming a translated version of the term; and
    searching the BPM data store for the translated version of the term in the second natural language.

6. The method of claim 1 further comprising:
    harvesting a set of BPM-based pairs of labels and descriptions in the first and second languages; and
    updating the BPM data store with the translated descriptive text.

7. An information handling system comprising:
    one or more processors;
    one or more data stores accessible by at least one of the processors;
    a memory coupled to at least one of the processors; and
    a set of computer program instructions stored in the memory and executed by at least one of the processors in order to perform actions of:
    receiving a term that is included in a Business Process Model (BPM) data store, wherein the term is from a first natural language, and wherein the term is included in a natural language question from a requestor to a question answering (QA) system, and wherein the BPM data store is included in a corpus utilized by the QA system;
    identifying that a first descriptive text of the term in the first natural language is lacking;
    retrieving a translated version of the term in a second natural language stored in the BPM data store, wherein a second descriptive text of the translated version of the term is present in the second natural language;
    translating the second descriptive text from the second natural language to the first natural language, resulting in a translated descriptive text; and
    providing, to the QA system, the translated descriptive text as a meaning of the term in the first natural language; and
    answering, by the QA system, the natural language question from the requestor, wherein the answering comprises:

searching the corpus for a plurality of candidate answers to the natural language question;

scoring the plurality of candidate answers, wherein the scoring indicates an extent to which each of the plurality of candidate answers is inferred by the natural language question, wherein the scoring further comprises weighting the plurality of scored candidate answers using a machine generated statistical model, wherein the statistical model indicates a level of confidence of the QA system, the weighting resulting in weighted scores corresponding to each of the candidate answers; and providing one or more of the candidate answers based on the weighted scores.

8. The information handling system of claim 7 wherein the actions further comprise:

updating the BPM with the translated descriptive text, wherein the translated descriptive text is stored in the BPM as the first descriptive text and wherein the first descriptive text is associated with the term.

9. The information handling system of claim 7 wherein the actions further comprise:

receiving, at the QA system, a question expression from the requestor;

identifying that the term is a business related term that is included in the received question expression;

receiving, at the QA system, the provided translated descriptive text as a context of the question expression; and wherein the answering utilizes the context of the question expression.

10. The information handling system of claim 7 wherein the BPM data store includes a plurality of natural languages that include the first and second natural languages, and wherein the actions further comprise:

searching through one or more of the plurality of natural languages to identify one of the natural languages with a stored term corresponding to the received term and a stored descriptive text that describes the stored term, wherein the identified natural language is used as the second natural language.

11. The information handling system of claim 7 wherein the actions further comprise:

identifying that the term is lacking from the BPM data store;

translating the term to the second natural language forming a translated version of the term; and searching the BPM data store for the translated version of the term in the second natural language.

12. The information handling system of claim 7 wherein the actions further comprise:

harvesting a set of BPM-based pairs of labels and descriptions in the first and second languages; and updating the BPM data store with the translated descriptive text.

13. A computer program product stored in a computer readable storage medium, comprising computer program code that, when executed by an information handling system, causes the information handling system to perform actions comprising:

receiving a term that is included in a Business Process Model (BPM) data store, wherein the term is from a first natural language, and wherein the term is included in a natural language question from a requestor to a question answering (QA) system, and wherein the BPM data store is included in a corpus utilized by the QA system;

identifying that a first descriptive text of the term in the first natural language is lacking;

retrieving a translated version of the term in a second natural language stored in the BPM data store, wherein a second descriptive text of the translated version of the term is present in the second natural language;

translating the second descriptive text from the second natural language to the first natural language, resulting in a translated descriptive text; and providing, to the QA system, the translated descriptive text as a meaning of the term in the first natural language; and answering, by the QA system, the natural language question from the requestor, wherein the answering comprises:

searching the corpus for a plurality of candidate answers to the natural language question;

scoring the plurality of candidate answers, wherein the scoring indicates an extent to which each of the plurality of candidate answers is inferred by the natural language question, wherein the scoring further comprises weighting the plurality of scored candidate answers using a machine generated statistical model, wherein the statistical model indicates a level of confidence of the QA system, the weighting resulting in weighted scores corresponding to each of the candidate answers; and providing one or more of the candidate answers based on the weighted scores.

14. The computer program product of claim 13 wherein the actions further comprise:

updating the BPM with the translated descriptive text, wherein the translated descriptive text is stored in the BPM as the first descriptive text and wherein the first descriptive text is associated with the term.

15. The computer program product of claim 13 wherein the actions further comprise:

receiving, at the QA system, a question expression from the requestor;

identifying that the term is a business related term that is included in the received question expression;

receiving, at the QA system, the provided translated descriptive text as a context of the question expression; and wherein the answering utilizes the context of the question expression.

16. The computer program product of claim 13 wherein the BPM data store includes a plurality of natural languages that include the first and second natural languages, and wherein the actions further comprise:

searching through one or more of the plurality of natural languages to identify one of the natural languages with a stored term corresponding to the received term and a stored descriptive text that describes the stored term, wherein the identified natural language is used as the second natural language.

17. The computer program product of claim 13 wherein the actions further comprise:

identifying that the term is lacking from the BPM data store;

translating the term to the second natural language forming a translated version of the term; and searching the BPM data store for the translated version of the term in the second natural language.

* * * * *